US011657833B2

(12) United States Patent
Sommerlade et al.

(10) Patent No.: US 11,657,833 B2
(45) Date of Patent: *May 23, 2023

(54) CLASSIFYING AUDIO SCENE USING SYNTHETIC IMAGE FEATURES

(71) Applicant: Microsoft Technology Licensing, LLC, Redmond, WA (US)

(72) Inventors: Eric Chris Wolfgang Sommerlade, Oxford (GB); Yang Liu, Reading (GB); Alexandros Neofytou, London (GB); Sunando Sengupta, Reading (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/452,306

(22) Filed: Oct. 26, 2021

(65) Prior Publication Data
US 2022/0044071 A1 Feb. 10, 2022

Related U.S. Application Data

(63) Continuation of application No. 16/844,930, filed on Apr. 9, 2020, now Pat. No. 11,164,042.
(Continued)

(51) Int. Cl.
H04N 5/272 (2006.01)
H04N 7/14 (2006.01)
G06F 18/214 (2023.01)
G06F 18/241 (2023.01)
G06V 10/764 (2022.01)
G10L 25/51 (2013.01)
G06V 10/82 (2022.01)
G06V 10/44 (2022.01)
G06V 20/00 (2022.01)

(52) U.S. Cl.
CPC ............ G10L 25/51 (2013.01); G06F 18/214 (2023.01); G06F 18/241 (2023.01); G06V 10/454 (2022.01); G06V 10/764 (2022.01); G06V 10/82 (2022.01); G06V 20/00 (2022.01); H04N 5/272 (2013.01); H04N 7/141 (2013.01)

(58) Field of Classification Search
CPC .... G06K 9/6256; G06K 9/6268; H04N 5/272; H04N 7/141; H04N 7/14; H04N 7/15; H04N 7/157
USPC ...................................... 348/14.02
See application file for complete search history.

(56) References Cited

U.S. PATENT DOCUMENTS

2020/0134929 A1* 4/2020 Krishnamurthy ....... A63F 13/60
2020/0135052 A1* 4/2020 Singh ..................... A63F 13/52
(Continued)

Primary Examiner — Maria El-Zoobi
(74) Attorney, Agent, or Firm — Alleman Hall Creasman & Tuttle LLP

(57) ABSTRACT

A computing system includes an encoder that receives an input image and encodes the input image into real image features, a decoder that decodes the real image features into a reconstructed image, a generator that receives first audio data corresponding to the input image and generates first synthetic image features from the first audio data, and receives second audio data and generates second synthetic image features from the second audio data, a discriminator that receives both the real and synthetic image features and determines whether a target feature is real or synthetic, and a classifier that classifies a scene of the second audio data based on the second synthetic image features.

18 Claims, 13 Drawing Sheets

Related U.S. Application Data

(60) Provisional application No. 62/961,049, filed on Jan. 14, 2020.

(56) References Cited

U.S. PATENT DOCUMENTS

| | | | | |
|---|---|---|---|---|
| 2020/0372370 A1* | 11/2020 | Donahue | ................ | G06N 3/045 |
| 2021/0201003 A1* | 7/2021 | Banerjee | ................ | G06V 40/16 |

* cited by examiner

CLASSIFYING AUDIO SCENE USING SYNTHETIC IMAGE FEATURES

CROSS REFERENCE TO RELATED APPLICATIONS

This application is a continuation of U.S. Nonprovisional patent application Ser. No. 16/844,930, filed Apr. 9, 2020, which claims priority to U.S. Provisional Patent Application Ser. No. 62/961,049, filed Jan. 14, 2020, the entirety of each of which is hereby incorporated herein by reference for all purposes.

BACKGROUND

Neural networks can be trained to classify audio recordings with a variety of labels. It is challenging for such networks to determine the type of location represented in an audio recording without using accompanying video footage. For example, recorded sound can vary wildly by time of day, geographic location, and the recording equipment used, all of which can negatively affect an attempt to classify the recorded audio. Compared to images, audio spectrograms to be classified have complicating characteristics, including that multiple sources in the environment may produce sound at the same time and patterns of audio features such as harmonics may appear due to the recording equipment used.

SUMMARY

A computing system is provided herein. The computing system may include a processor having associated memory storing instructions that cause the processor to execute, at training time, for each of a plurality of input images, an encoder configured to receive an input image of the plurality of input images and encode the input image into real image features. The processor may be further caused to execute a decoder configured to receive from the encoder the real image features and decode the real image features into a reconstructed image. The processor may be further caused to execute a generator configured to receive first audio data corresponding to the input image and generate first synthetic image features from the first audio data, and to receive second audio data and generate second synthetic image features from the second audio data. The processor may be further caused to execute a discriminator configured to receive the real image features and first synthetic image features and to output a determination of whether a target feature is real or synthetic. The processor may be further caused to execute a classifier configured to receive the second synthetic image features and classify a scene of the second audio data based on the second synthetic image features.

In another aspect of the present disclosure, a computing system is described herein. The computing system may include a processor having associated memory storing a discriminator configured to determine whether a target feature is real or synthetic, a generator having been trained on an audio-visual pair of image data and first audio data with the discriminator, and a classifier having been trained on second audio data. The memory may further include instructions that cause the processor to execute, at runtime, the generator configured to generate synthetic image features from third audio data, and the classifier configured to classify a scene of the third audio data based on the synthetic image features.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 9 and 10 are arrays of images comparing the output of the computing system of FIG. 8 to the output of a different system.

DETAILED DESCRIPTION

Deep learning technologies such as fully-connected neural networks, convolutional neural networks (CNNs), and recurrent neural networks (RNNs) typically classify audio data using the log-mel spectrogram of audio recordings as input, where the output is the probability of a given scene being present in the recording. However, the local spectrograms of a scene such as "park," for both lower and higher frequencies, are different in different locations, for example, in different cities or in different parts of the world. The discrepancy is even greater when the recording equipment used to record the audio is not consistent between recordings.

Figure 1:
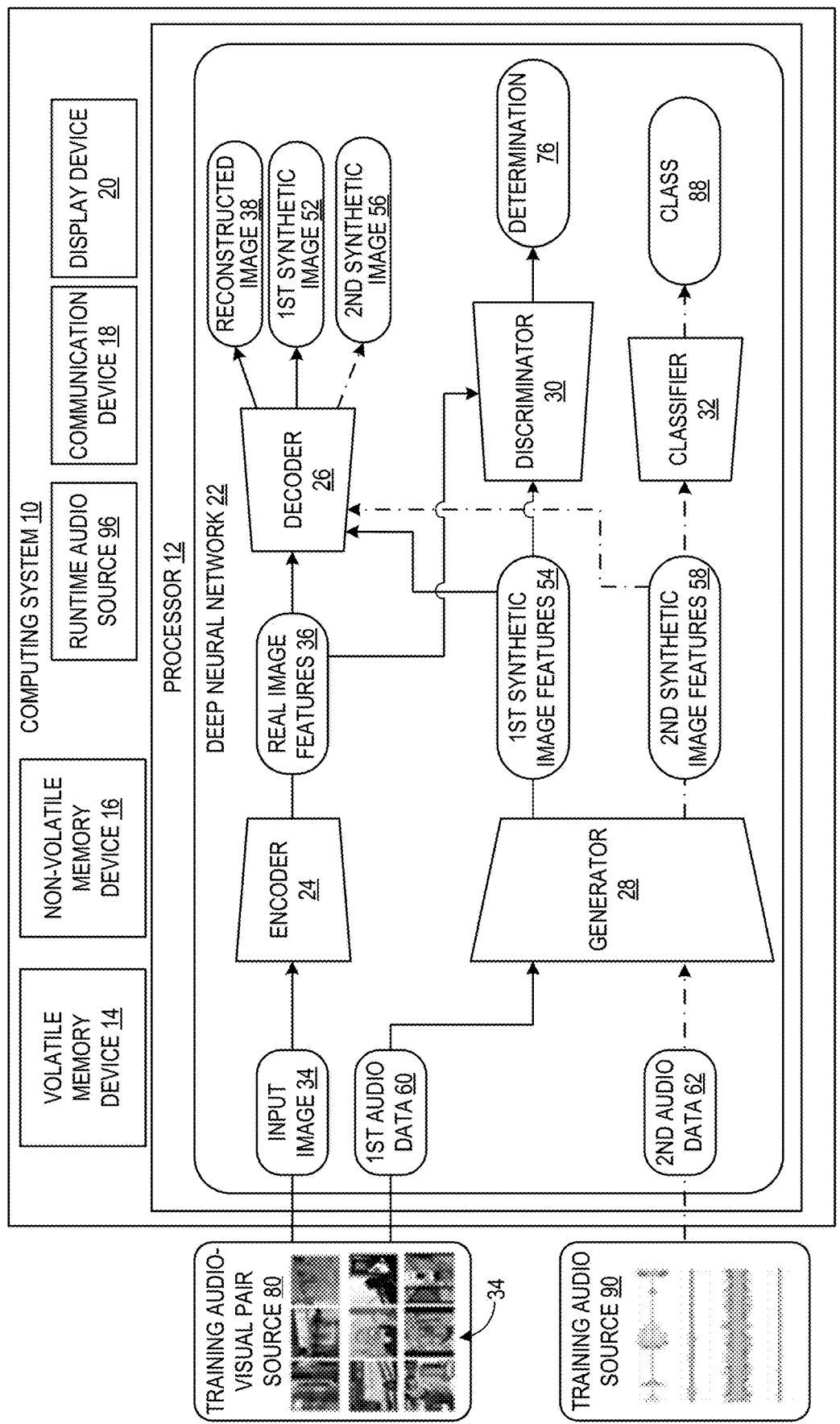
FIG. 1 is a schematic view of a computing system for classifying an acoustic scene according to one embodiment of the presented disclosure.

To address the issues discussed above, FIG. 1 illustrates an example computing system 10 configured to classify an acoustic scene. The computing system 10 may include a processor 12 having associated memory such as volatile memory device 14 and non-volatile memory device 16, a communication device 18 to enable wireless or wired communication, a display device 20, and other computer components not specifically illustrated in FIG. 1. The computing system 10 may include a deep neural network 22, one example of which is illustrated in FIG. 1. Briefly, the deep neural network 22 may include an encoder 24, a decoder 26, a generator 28, a discriminator 30, and a classifier 32 which constitute an audio-visual generative adversarial network (AVGAN). The processor may be configured to execute instructions using portions of the memory to perform the functions and processes described herein. In one example, the computing system 10 may take the form of a desktop computing device, a laptop computing device, a smartphone, a large format display computing device, or another suitable form.

In accordance with the example shown in FIG. 1, the associated memory may store instructions that cause the processor 12 to execute, at training time, for each of a plurality of input images 34, the encoder 24 configured to receive an input image 34 of the plurality of input images 34 and encode the input image 34 into real image features 36. The processor 12 may further execute the decoder 26 configured to receive from the encoder 24 the real image features 36 and decode the real image features 36 into a reconstructed image 38. This reconstructed image 38 may be a two-dimensional representation of processed data, either audio or visual, which can be used to train the encoder 24 and decoder 26 as well as be displayed on the display device 20 for the benefit of a user. First, example architecture of each part of the deep neural network 22 will be introduced with reference to FIGS. 2-6.

Figure 2:
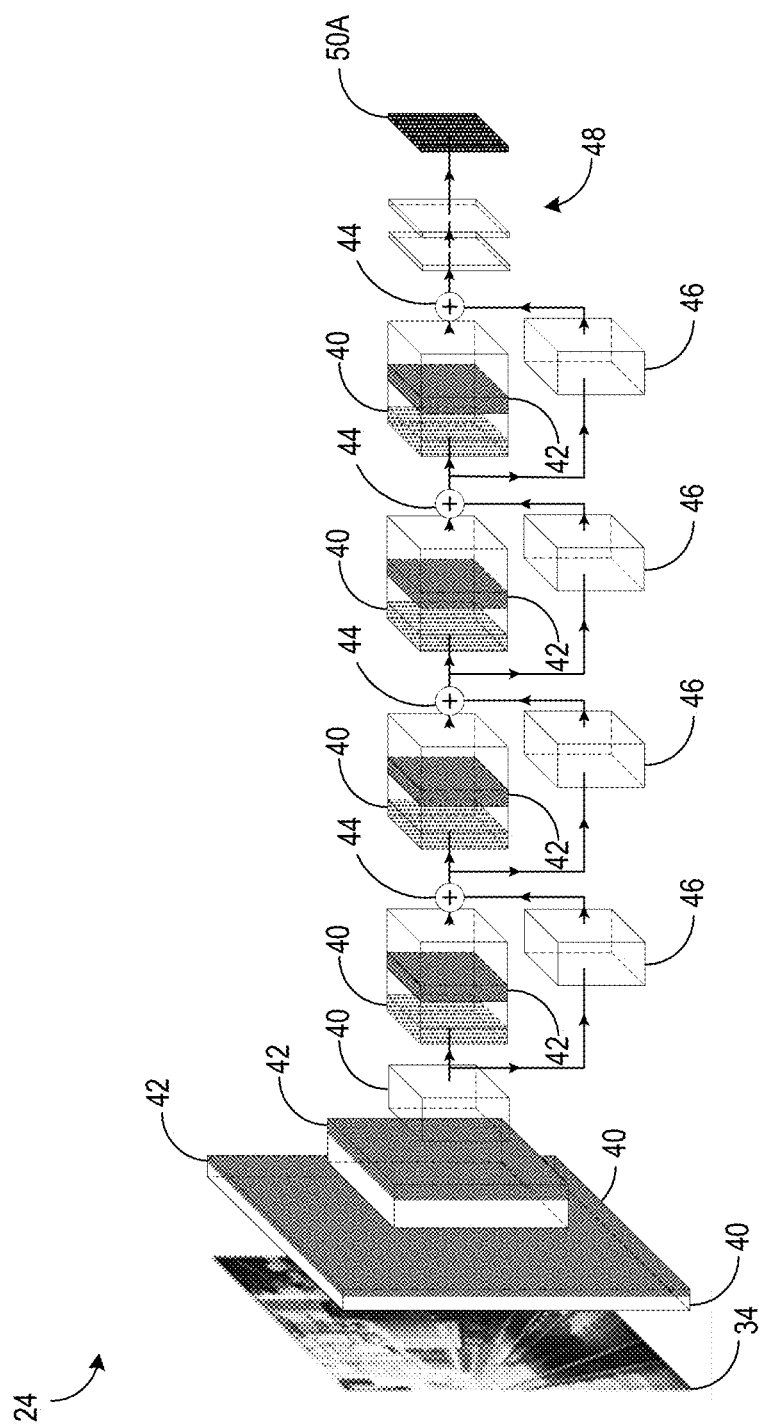
FIG. 2 is an example architectural diagram of an encoder of the computing system of FIG. 1.
Figure 3:
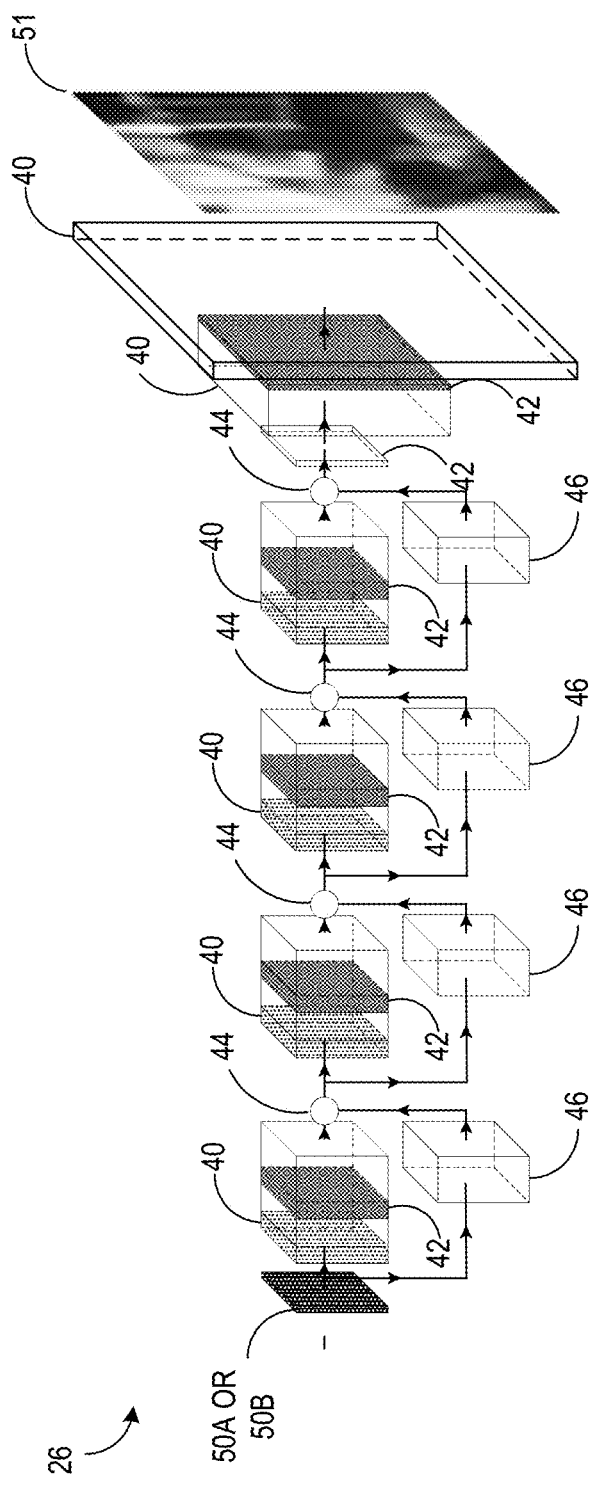
FIG. 3 is an example architectural diagram of a decoder of the computing system of FIG. 1.

Turning to FIGS. 2 and 3, which are respective architectural diagrams of the encoder 24 and decoder 26, the encoder 24 and the decoder 26 may include vector quantized variational autoencoder (VQ-VAE) architecture. The example encoder 24 of FIG. 2 begins with the input image 34 having dimensions of 128*128*3. It will be understood that for the input image 34 and other components of the deep neural network 22, the dimensions provided herein are merely exemplary and other suitable dimensions may be substituted. Furthermore, in order to represent layers of varying dimensions in a single viewable drawing, some larger layers in FIGS. 2-6 are not shown to scale. The encoder 24 may include convolutional layers 40 and rectified linear units (ReLU) 42 separated by residual connections 44 where residual stacks 46 reconnect. In the illustrated example, four layer groups of convolutional-activation layers are provided to output at a VQ layer 48, a feature tensor 50A having the dimensions 16*16*1. The four residual stacks 46 may allow for the encoding of deep and discrete features in the feature tensor 50A, and each residual stack 46 may include 128 filers. Compared to the input image 34 dimensions of 128*128*3, the feature tensor 50A is a low-dimensional vector which includes the real image features 36 with less featureless space. The low-dimensional feature tensor 50A is both less computationally expensive to process than the larger input image 34 and reduces mode collapse, as will be described in greater detail later with reference to the generator 28.

The example decoder 26 illustrated in FIG. 3 begins with the feature tensor 50A having the real image features 36 as input. The decoder 26 may instead use a feature tensor 50B described below with reference to the generator 28. The decoder 26 may similarly include four layer groups including the convolutional layers 40 and the ReLU functions separated by the residual connections 44 where the residual stacks 46 reconnect. The output of the decoder 26 is an image 51. The image 51 may be the reconstructed image 38, which may have the same dimensions as the input image 34, 128*128*3. In addition to reconstructing the reconstructed image 38 from the real image features 36, the decoder 26 may be further configured to construct a first synthetic image 52 from first synthetic image features 54 and a second synthetic image 56 from second synthetic image features 58 as the image 51. Briefly, building images from synthetic features may reduce the incidence of mode collapse, provide input for the training of the deep neural network 22, and visually demonstrate the functioning of the deep neural network 22. Generation of synthetic image features will be discussed in detail later with reference to the generator 28.

During training, the processor may be further configured to loop through several steps, the first of which is training the encoder and the decoder to increase a correlation of each of the reconstructed image 38 and the first synthetic image 52 to the respective input image 34. For example, the training objective may be $$L_{enc,dec} = \frac{\|I - I'\|_2^2 + \lambda \|I - I'_g\|_2^2}{v_I} + \|sg[f] - e\|_2^2 + \beta \|f - sg[e]\|_2^2,$$

where I is the input image 34 and $v_I$ is the variation of training images. I' and $I_g$' are the reconstructed image 38 and the first synthetic image 52. f is the real image features 36 and e is embedding vectors. sg represents the stop-gradient operator that is defined as an identity at the forward computation time and has zero partial derivatives. The decoder 26 with the embedding layers may optimize the first two loss terms, while the encoder 24 may optimize the first and the last loss terms. The weight β of the latent loss of the VQ-layer may be 1, and the weight λ of reconstruction loss from the generator 28 may be 0.1. Accordingly, optimization of the training objective seeks to ensure that the encoder 24 accurately extracts the real image features 36 from the input image 34 and encodes them to a lower dimension, and that the decoder 26 is able to accurately construct, or reconstruct, an image from mere features. However, it will be appreciated that the ultimate goal of the decoder 26 is not to reconstitute the real image features 36 into an exact replica of the original input image 34, but rather, to construct an image that accurately represents the scene of the original data. As the VAE-based encoder 24 and decoder 26 may ban high-frequency information, details having no bearing on the classification, such as the faces of people or logos on products, may be ignored.

As shown in the overview of FIG. 1, the processor 12 may execute, at training time, for each of the plurality of input images 34, the generator 28 configured to receive first audio data 60 corresponding to the input image 34 and generate the first synthetic image features 54 from the first audio data 60. Further, the generator 28 may be configured to receive second audio data 62 and generate the second synthetic image features 58 from the second audio data 62. Thus, the generator 28 may generate synthetic features from audio data, whether the audio data has accompanying video footage or not. In order to generate these synthetic features, the generator 28 may include the example architecture shown in FIG. 4.

Figure 4:
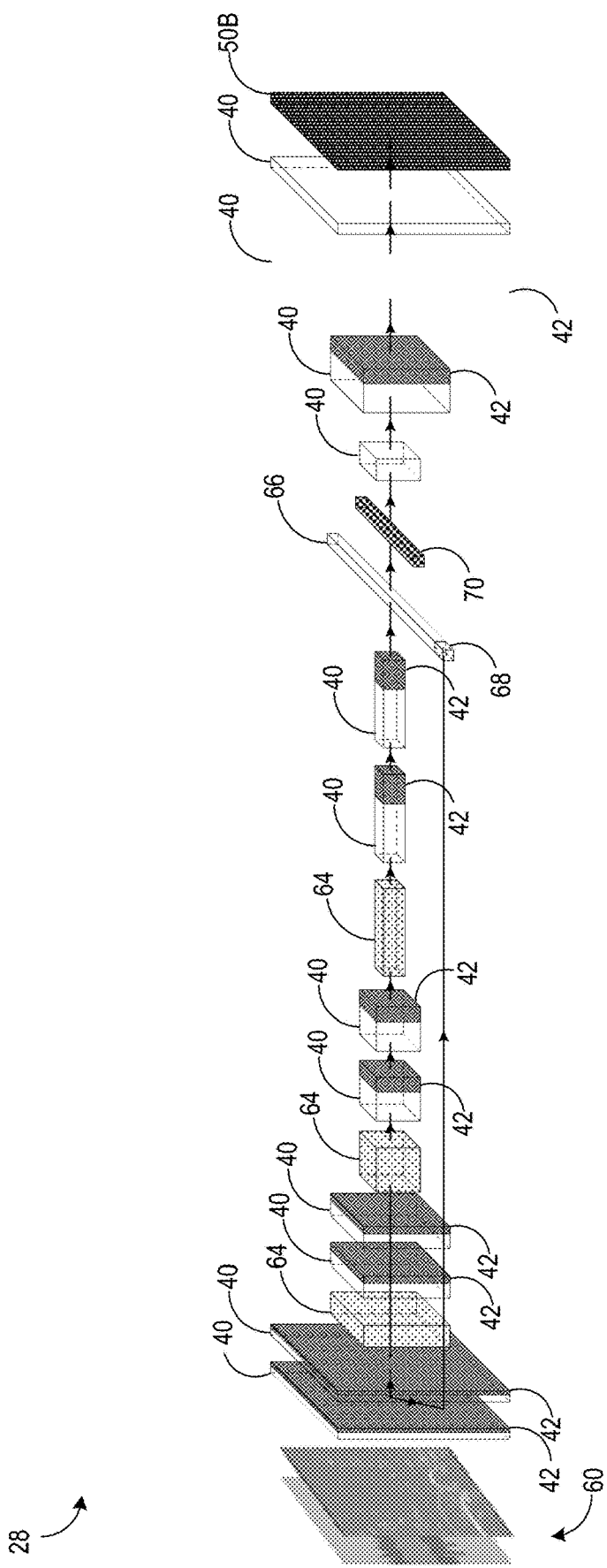
FIG. 4 is an example architectural diagram of a generator of the computing system of FIG. 1.
Figure 5:
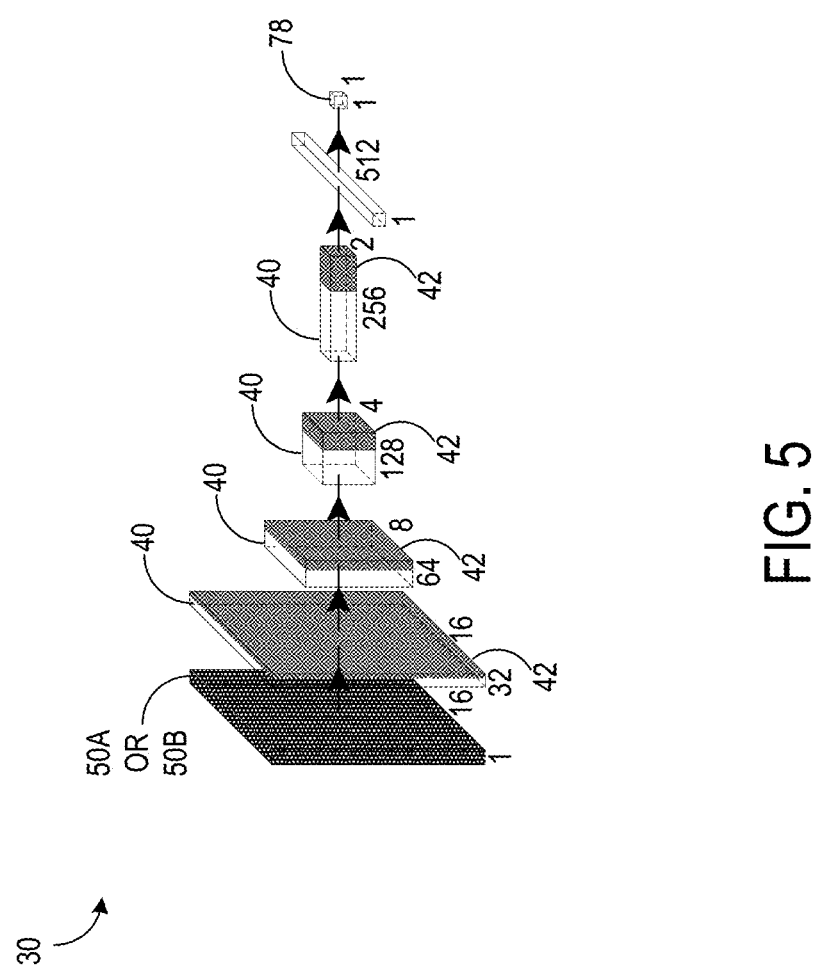
FIG. 5 is an example architectural diagram of a discriminator of the computing system of FIG. 1.

In one implementation, the generator 28 and the discriminator 30 (see FIG. 5) may include Wasserstein generative adversarial network gradient penalty (WGAN-GP) architecture. As shown in FIG. 4, the generator 28 may include a log-mel spectrogram of the first audio data 60 as input, which may have dimensions of 64*64 (frequency*time). The generator 28 may include the convolutional layers 40 and the Leaky ReLU functions 42 in three layer groups, this time also each including a pooling layer 64. Next, the generator 28 may include a 1024*1 vector 66 calculated by these three layer groups, and the 1024*1 vector 66 may be concatenated with a 16*1 vector 68 representing the maximum value of the spectrogram along only the temporal dimension to preserve more of the local audio characteristics since they are better contained in the frequency content, whereas linguistic information usually spans a longer time duration. The concatenation here may present the deep and local features together in a single vector. The 1024*1 vector 66 then passes a full connection and batch normalization layer 70 which decreases the length of the vector to 512, shaped as 4*4*128. Finally, a tan h activation function may output a 16*16 feature tensor 50B containing the synthesized features (e.g., first synthetic image features 54 or second synthetic image features 58).

Figure 7:
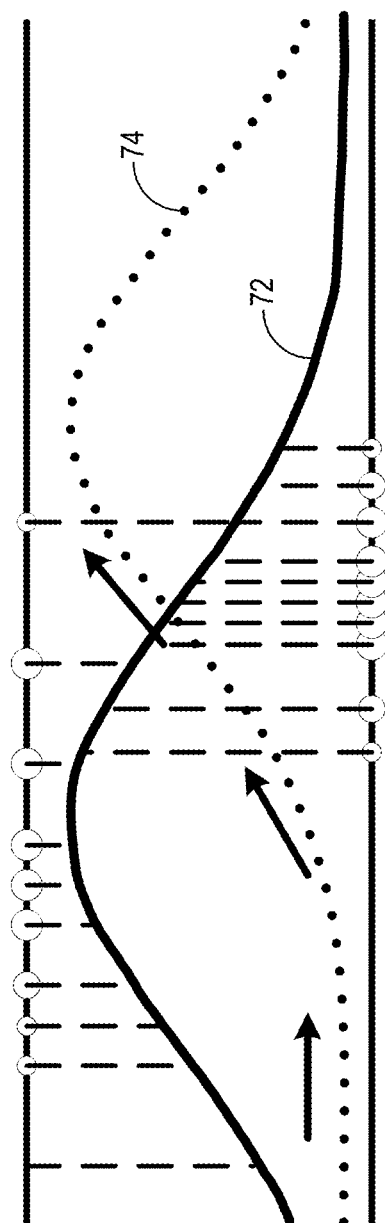
FIG. 7 is an example diagram of a distribution's mode shift of the computing system of FIG. 1.

If the generator 28 were used to generate images directly, mode collapse would become much more likely to occur. Mode collapse is when the output of the generator (or here, the reconstructed or synthetic images built by the decoder 26 from the output of the generator) begins to look alike so that there are fewer distinct types (modes) of output. For example, three reconstructed or synthetic images that are each supposed to respectively represent a park, a train station, and a bus instead all look noisy and nearly identical. In the neural network 22, mode collapse renders the output images unmeaningful and classification unsuccessful. Mode collapse can occur because the divergence between the audio and video (input image) distribution is large, as shown in FIG. 7. As shown, there is little overlap between an input feature distribution 72 and a target feature distribution 74. The ideal aim of training the generator 28 is to match these distributions 72, 74, and the ability of the generator 28 to do so is based on the overlap between the distributions 72, 71. If the overlap is large, it is very easy to find matching functions, and if the overlap is small, it is difficult. Because the eventual input to the trained generator 28 is audio data while the output is image data, there are many features belonging to each distribution, but few features common to both distributions.

To address this problem, the output of the generator 28, like the output of the encoder 24, may be a 16*16*1 feature tensor 50B. Thus, the encoded features are low-dimensional and discrete, more meaningful features are extracted from the audio data, and the overlapping area between the two distributions is increased. In order to tie together the real image features 36 encoded by the encoder with the synthetic image features 54, 58 generated by the generator 28, the processor 12 may execute, at training time, for each of the plurality of input images 34, the discriminator 30 configured to receive the real image features 36 and first synthetic image features 54 and to output a determination 76 of whether a target feature is real or synthetic. The target feature may be any given feature currently being processed by the discriminator 30, of the real image features 36 and first synthetic image features 54. Thus, the discriminator 30 may be configured to determine whether or not a feature being processed belongs to a real image feature distribution. In a second step of the training loop, the processor 12 may train the generator 28, based on the determination 76 output by the discriminator 30. Thus, if the generator 28 produces a first synthetic image feature 54 that the discriminator 30 determines does not belong to a real image feature distribution, then the discriminator may penalize the generator 28. The generator 28 may be properly trained when the discriminator 30 becomes more confused between synthetic and real features, that is, when the generator 28 is able to generate synthetic image features that are close to real image features.

Figure 6:
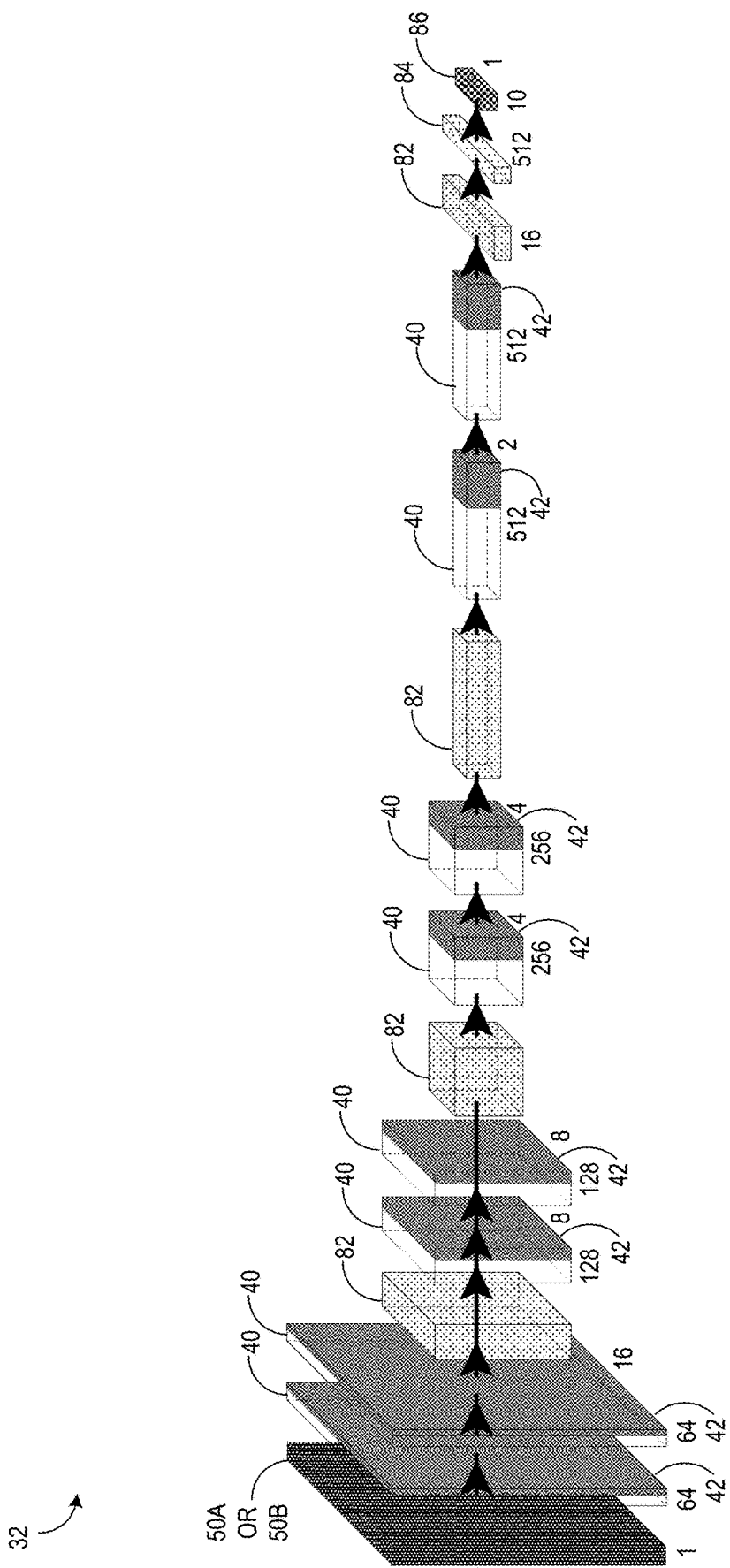
FIG. 6 is an example architectural diagram of a classifier of the computing system of FIG. 1.

FIG. 6 illustrates example architecture of the discriminator 30. The input is a 16*16*1 feature tensor, which may be the feature tensor 50A output from the encoder 24 or the feature tensor 50B output from the generator 28. The input is passed through a series of convolutional layers 40 and Leaky ReLU functions 42. In this example, the discriminator 30 is configured to output a boolean value 78 as the determination 76, which as discussed above may be used to penalize and train the generator 28. The loss of the generator 28 may be calculated by the output of discriminator 30 and decoder 26. In a third step of the training loop, the processor 12 may train the discriminator 30 while the encoder 24 is fixed so that the discriminator 30 can accurately distinguish real from synthetic features. These three steps may be repeated in a first phase of training until the generator 28 is able to generate features close to the output of the encoder 24. For the first phase of training, shown with solid arrows in FIG. 1, the first audio data 60 may correspond to the input image 34 in an audio-visual pair recorded together. In FIG. 1, this is shown by the input image 34 and first audio data 60 coming from a training audio-visual pair source 80 such as a video dataset.

FIG. 1 also illustrates that the processor 12 may execute, at training time, for each of the plurality of input images 34, the classifier 32 configured to receive the second synthetic image features 58 and classify a scene of the second audio data 62 based on the second synthetic image features 58. Example architecture of the classifier 32 is illustrated in FIG. 6. The classifier 32 may include CNN architecture. The input feature dimensions may be 16*16*1, and the classifier 32 may include, for example, a plurality of six convolutional layers 40 (here, six), a plurality of mean-pooling layers 82 (here, four), and a max pooling layer 84. Finally, the output 86 of the classifier may include an indication of a class 88 to which the second audio data 62 belongs, where the dimension of the output 86 is the number of possible categories. For the illustrated example, 10 categories are possible. In a second phase of training, shown in dot-dashed arrows in FIG. 1, the processor may be further configured to train the classifier 32 while the encoder 24, decoder 26, generator 28, and discriminator 30 are fixed. As opposed to the first audio data 60 of the audio-visual pair, the second audio data 62 may not be paired with an image, and is therefore illustrated as coming from a training audio source 90. The second audio data 62 may be selected so that clips having scenes of a known category are input to the deep neural network 22, and the classifier 32 may be penalized based on a comparison of the known category and the output class 88. Furthermore, the first audio data 60 and the second audio data 62 may be recordings generated at substantially different geographical locations, and the training audio source 90 may additionally include various locations and recording equipment represented by the various clips of second audio data 62. As a result, the classifier 32 may be trained to be insensitive to location and be able to accurately predict the class 88 of an audio clip from an unknown location.

Figure 8:
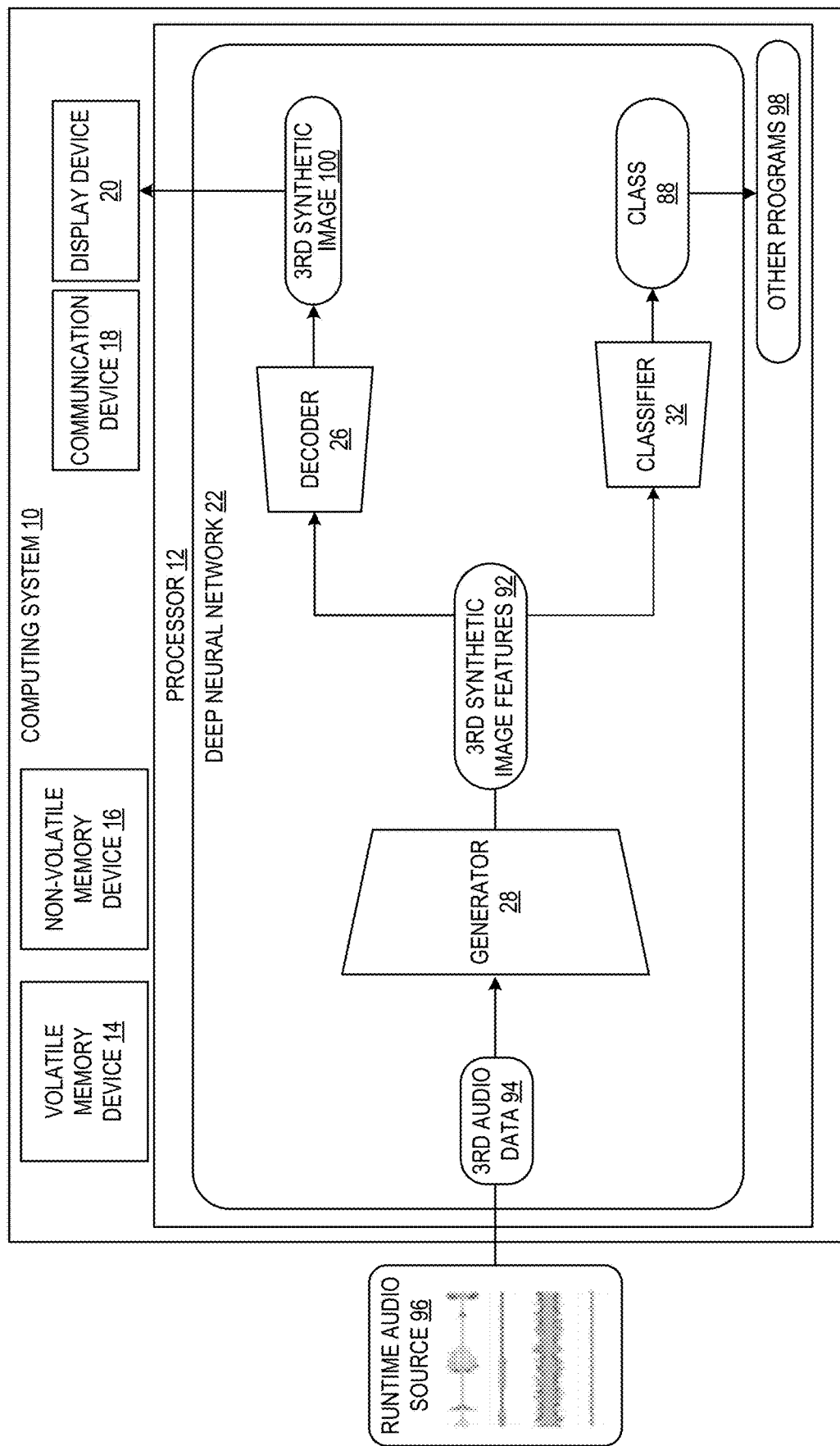
FIG. 8 is a schematic view of the computing system of FIG. 1, at runtime.

Once trained, the deep neural network 22 may be executed at runtime, as shown in FIG. 8. In one example, the processor 12 may be further configured to execute, at runtime, the generator 28, which is further configured to generate third synthetic image features 92 from third audio data 94. The source of the third audio data 94 may be a runtime audio source 96, which may be an internal source such as stored data or a microphone of the computing system 10, or may be an external source in communication with the computing system 10. The processor 12 may be further configured to execute, at runtime, the classifier 32, which is further configured to classify a scene of the third audio data 94 based on the third synthetic image features 92.

The class 88 of the third audio data 94 may be used by a variety of other programs 98. For example, the processor 12 may be further configured to use the classified scene (e.g., class 88) of the third audio data 94 as a factor in authentication of a user or in setting permissions. In this manner, the computing system 10 may be able to restrict access to confidential or sensitive files based in part on the class 88 belonging to a public category, mismatching an expected or required scene, etc. In another example, the processor 12 may be further configured to augment a navigation service based on comparing the classified scene (e.g., class 88) of the third audio data 94 to a scene of one or more known locations. Users with navigation devices, smartphones running navigation apps, etc. may experience improved navigation accuracy, or autonomous vehicles may experience decreased navigation errors when locating themselves. In still another example, an autonomous vehicle such as an assistance robot, may be configured to change its performance mode based at least in part on the class 88 of the third audio data 94. For instance, a robot that has determined the current scene to be "REC ROOM" may change its mode to play games with residents and avoid traversing in front of the television screen, and then change its mode again when the scene is determined to be "DOCTOR'S OFFICE," where the robot is programmed to receive instructions from or convey a message to the doctor.

In some implementations, the processor 12 may be further configured to, at runtime, execute the decoder 26, which is further configured to receive the third synthetic image features 92 and construct a third synthetic image 100 from the third synthetic image features 92. The computing system 10 may not have access to corresponding video footage, for example, in the case where the microphone is used to gather the audio data. Alternatively, the computing system 10 may have access to corresponding video footage, but processing of the footage and transmission of the footage may be suppressed for privacy reasons. For example, the processor 12 may be further configured to, at runtime, display the third synthetic image 100 as a background image of a participant in a video chat, the third synthetic image 100 including generic features relating to the classified scene (e.g., class 88) of the third audio data 94 and lacking private identifying features of a real-world background of the participant. In this manner, the image displayed behind the participant may be more appropriate for the given scene, such as "CAFE," than a random tagged picture retrieved from the internet, but non-consenting people in the background may not be represented due to the functioning of the decoder 26 which constructs a synthetic-feature-rich representation of the class in image form, rather than recreating the actual image including private features. Furthermore, the participant in the video chat may not wish for their precise location to be known to other participants, and therefore details such as logos or localized objects (e.g., a furnishing common in a particular part of the world) may not be included in the third synthetic image 100.

Figure 9:
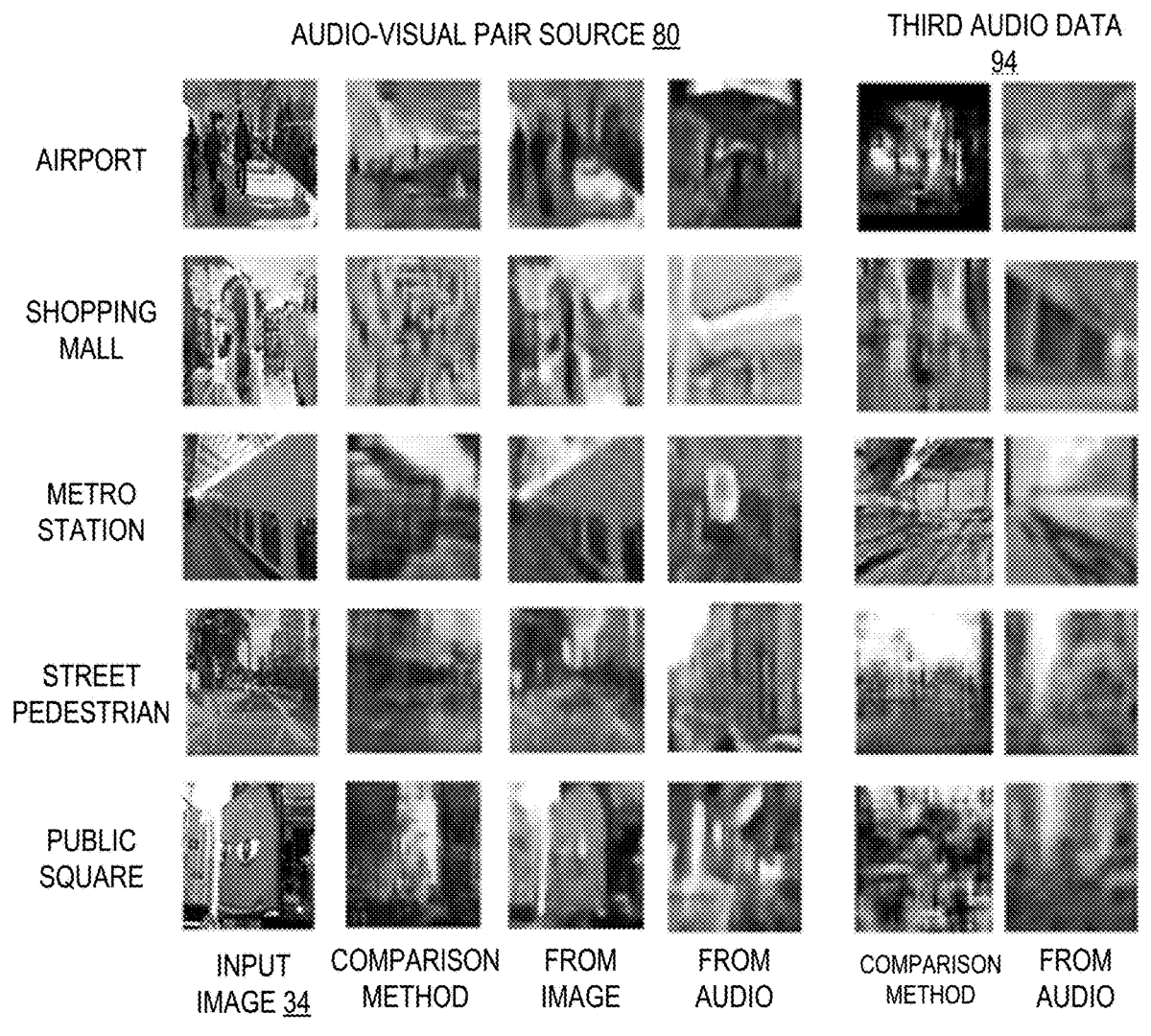
Figure 10:
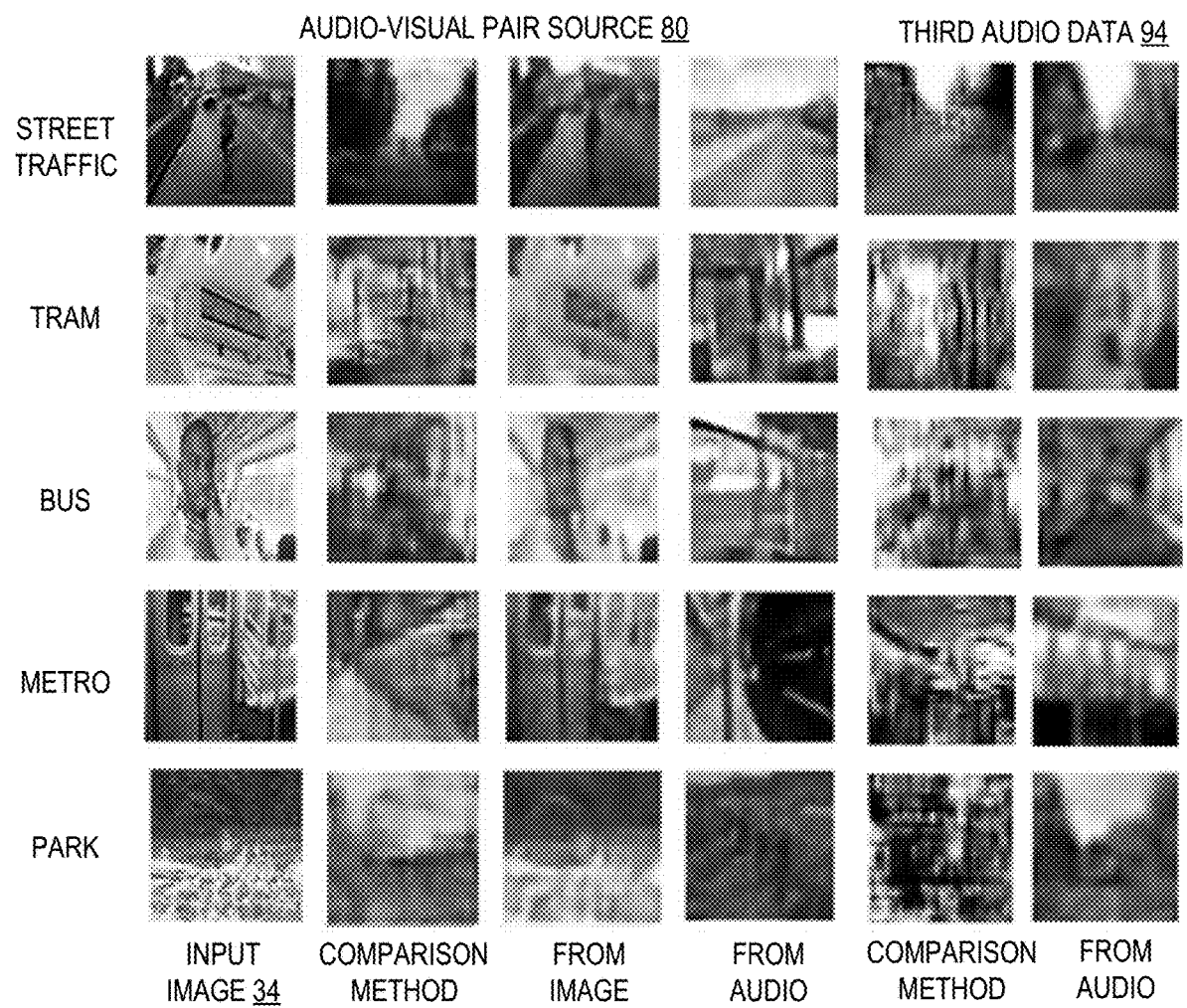

FIGS. 9 and 10 are arrays of images comparing the output of the computing system 10 to the output of a system which directly generates images from audio without the deep neural network 22 described above. In both figures, the first four columns are for reconstruction of the scene of an audio-visual pair, where the first column is the original input image 34, the second column is the reconstruction directly from audio, the third column is the reconstructed image 38 (reconstructed from the input image 34), and the fourth column is the first synthetic image 52 (constructed from the first audio data 60). The fifth and sixth columns are for reconstruction of the scene of the runtime audio (third audio data 94), where the fifth column is the reconstruction directly from the audio and the sixth column is the third synthetic image 100. As can be seen, the third column closely resembles the input image 34 because the input image 34 is the source of the reconstruction, much more than the comparison method which does not generate synthetic features before generating the reconstructed image. The fourth column still clearly belongs to the scene category, despite having some different details. For the fifth and sixth columns, the comparison method does poorly for many categories. However, the sixth column shows that the deep neural network 22 model, which enforces generation of synthetic features with the encoder 24 and decoder 26 trained on wild audio-visual data, has less noise and is more recognizable as the scene category, even to the human eye. The comparison method was able to correctly classify scenes from known cities on which the model was trained 86.7% but only 77.9% of the time for unknown, new cities. However, the deep neural network 22 was able to correctly classify known cities 87.6% and unknown cities 85.8% of the time, showing a clear advantage over the comparison method for unknown cities.

Figure 11A:
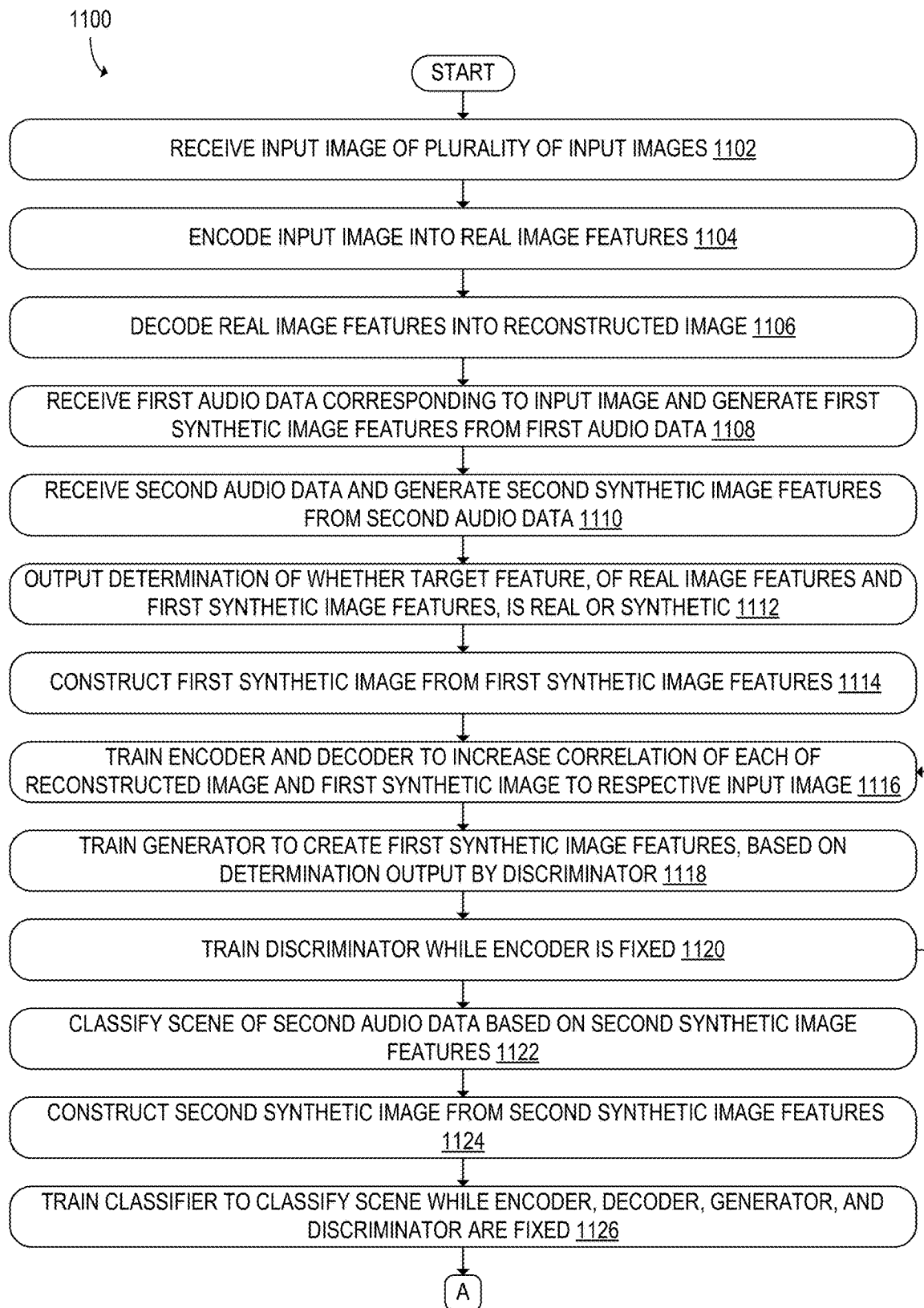
FIGS. 11A-11B show a flowchart of an example method for classifying an acoustic scene, executed by the computing system of FIG. 1.
Figure 11B:
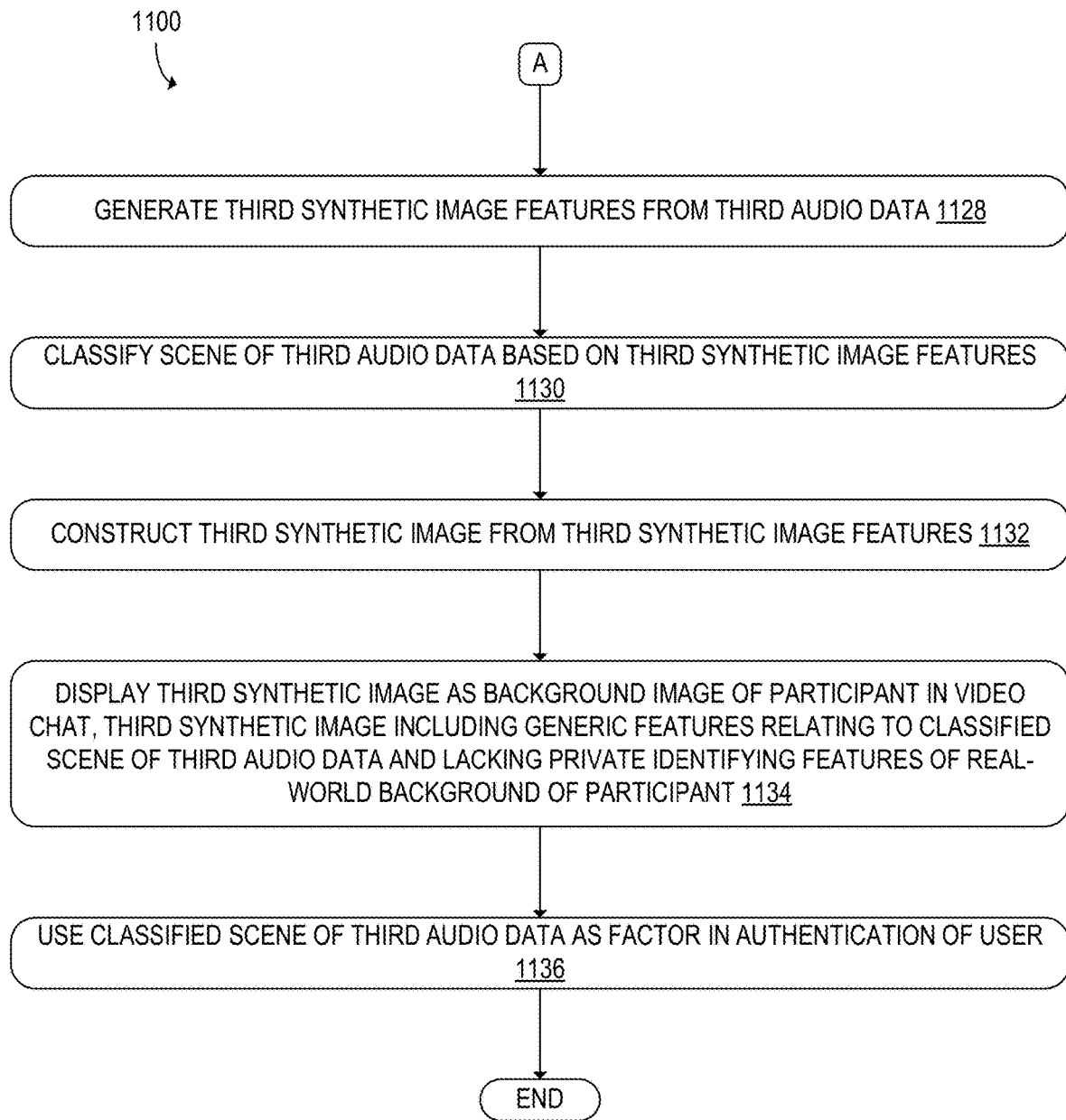

FIGS. 11A-B show a flowchart for a computer-implemented method 1100 for classifying an acoustic scene. The method 1100 may be implemented by the computing system 10 illustrated in FIG. 1.

It will be appreciated that the following method steps 1102 through 1126 may be performed at a processor at training time of a neural network, for each of a plurality of input images. At 1102, the method 1100 may include receiving an input image of the plurality of input images. At 1104, the method 1100 may include encoding the input image into real image features. At 1106, the method 1100 may include decoding the real image features into a reconstructed image. At 1108, the method 1100 may include receiving first audio data corresponding to the input image and generating first synthetic image features from the first audio data. At 1110, the method 1100 may include receiving second audio data and generating second synthetic image features from the second audio data. At 1112, the method 1100 may include outputting a determination of whether a target feature, of the real image features and first synthetic image features, is real or synthetic.

At 1114, the method 1100 may include constructing a first synthetic image from the first synthetic image features. The method 1100 may include looping through steps 1116 through 1120. At 1116, the method 1100 may include training an encoder and a decoder to increase a correlation of each of the reconstructed image and the first synthetic image to the respective input image. At 1118, the method 1100 may include training a generator to create the first synthetic image features, based on the determination output by a discriminator. At 1120, the method 1100 may include training the discriminator while the encoder is fixed. At 1122, the method 1100 may include classifying a scene of the second audio data based on the second synthetic image features. At 1124, the method 1100 may include constructing a second synthetic image from the second synthetic image features. At 1126, the method 1100 may include training a classifier to classify the scene while the encoder, decoder, generator, and discriminator are fixed. In this manner, the classifier may be trained to accurately classify the scene even in unknown locations.

It will be appreciated that the following method steps 1128 through 1136 may be performed at runtime, on the same or a different processor as the steps performed at training time. At 1128, the method 1100 may include generating third synthetic image features from third audio data. At 1130, the method 1100 may include classifying a scene of the third audio data based on the third synthetic image features. At 1132, the method 1100 may include constructing a third synthetic image from the third synthetic image features. At 1134, the method 1100 may include displaying the third synthetic image as a background image of a participant in a video chat, the third synthetic image including generic features relating to the classified scene of the third audio data and lacking private identifying features of a real-world background of the participant. At 1136, the method 1100 may include using the classified scene of the third audio data as a factor in authentication of a user.

The following paragraphs provide additional support for the claims of the subject application. One aspect provides a computing system comprising a processor having associated memory storing instructions that cause the processor to execute, at training time, for each of a plurality of input images, an encoder configured to receive an input image of the plurality of input images and encode the input image into real image features, a decoder configured to receive from the encoder the real image features and decode the real image features into a reconstructed image, a generator configured to receive first audio data corresponding to the input image and generate first synthetic image features from the first audio data, and to receive second audio data and generate second synthetic image features from the second audio data, a discriminator configured to receive the real image features and first synthetic image features and to output a determination of whether a target feature is real or synthetic, and a classifier configured to receive the second synthetic image features and classify a scene of the second audio data based on the second synthetic image features. In this aspect, additionally or alternatively, the decoder is further configured to construct a first synthetic image from the first synthetic image features and a second synthetic image from the second synthetic image features. In this aspect, additionally or alternatively, the processor is further configured to loop through training the encoder and the decoder to increase a correlation of each of the reconstructed image and the first synthetic image to the respective input image, training the generator, based on the determination output by the discriminator, and training the discriminator while the encoder is fixed. In this aspect, additionally or alternatively, the processor is further configured to train the classifier while the encoder, decoder, generator, and discriminator are fixed. In this aspect, additionally or alternatively, the first audio data corresponds to the input image in an audio-visual pair recorded together, the second audio data is not paired with an image, and the first audio data and the second audio data are recordings generated at substantially different geographical locations. In this aspect, additionally or alternatively, the encoder, the decoder, the generator, the discriminator, and the classifier constitute an audio-visual generative adversarial network, the encoder and the decoder include vector quantized variational autoencoder architecture, and the classifier includes convolutional neural network (CNN) architecture. In this aspect, additionally or alternatively, the processor is further configured to execute, at runtime, the generator, which is further configured to generate third synthetic image features from third audio data, and the classifier, which is further configured to classify a scene of the third audio data based on the third synthetic image features. In this aspect, additionally or alternatively, the processor is further configured to, at runtime, execute the decoder, which is further configured to receive the third synthetic image features and construct a third synthetic image from the third synthetic image features, and display the third synthetic image as a background image of a participant in a video chat, the third synthetic image including generic features relating to the classified scene of the third audio data and lacking private identifying features of a real-world background of the participant. In this aspect, additionally or alternatively, the processor is further configured to use the classified scene of the third audio data as a factor in authentication of a user. In this aspect, additionally or alternatively, the processor is further configured to augment a navigation service based on comparing the classified scene of the third audio data to a scene of one or more known locations.

Another aspect provides a method comprising, at a processor at training time of a neural network, for each of a plurality of input images, receiving an input image of the plurality of input images and encoding the input image into real image features, decoding the real image features into a reconstructed image, receiving first audio data corresponding to the input image and generating first synthetic image features from the first audio data, and receiving second audio data and generating second synthetic image features from the second audio data, outputting a determination of whether a target feature, of the real image features and first synthetic image features, is real or synthetic, and classifying a scene of the second audio data based on the second synthetic image features. In this aspect, additionally or alternatively, the method further comprises constructing a first synthetic image from the first synthetic image features and a second synthetic image from the second synthetic image features. In this aspect, additionally or alternatively, the method further comprises looping through training an encoder and a decoder to increase a correlation of each of the reconstructed image and the first synthetic image to the respective input image, training a generator to create the first synthetic image features, based on the determination output by a discriminator, and training the discriminator while the encoder is fixed. In this aspect, additionally or alternatively, the method further comprises training a classifier to classify the scene while the encoder, decoder, generator, and discriminator are fixed. In this aspect, additionally or alternatively, the encoder, the decoder, the generator, the discriminator, and the classifier constitute an audio-visual generative adversarial network, the encoder and the decoder include vector quantized variational autoencoder architecture, and the classifier includes convolutional neural network (CNN) architecture. In this aspect, additionally or alternatively, the first audio data corresponds to the input image in an audio-visual pair recorded together, the second audio data is not paired with an image, and the first audio data and the second audio data are recordings generated at substantially different geographical locations. In this aspect, additionally or alternatively, the method further comprises at the processor, at runtime, generating third synthetic image features from third audio data, and classifying a scene of the third audio data based on the third synthetic image features. In this aspect, additionally or alternatively, the method further comprises, at runtime, constructing a third synthetic image from the third synthetic image features, and displaying the third synthetic image as a background image of a participant in a video chat, the third synthetic image including generic features relating to the classified scene of the third audio data and lacking private identifying features of a real-world background of the participant. In this aspect, additionally or alternatively, the method further comprises using the classified scene of the third audio data as a factor in authentication of a user.

Another aspect provides a computing system comprising a processor having associated memory storing a discriminator configured to determine whether a target feature is real or synthetic, a generator having been trained on an audio-visual pair of image data and first audio data with the discriminator, a classifier having been trained on second audio data, and instructions. The instructions cause the processor to execute, at runtime, the generator configured to generate synthetic image features from third audio data, and the classifier configured to classify a scene of the third audio data based on the synthetic image features.

In some embodiments, the methods and processes described herein may be tied to a computing system of one or more computing devices. In particular, such methods and processes may be implemented as a computer-application program or service, an application-programming interface (API), a library, and/or other computer-program product.

Figure 12:
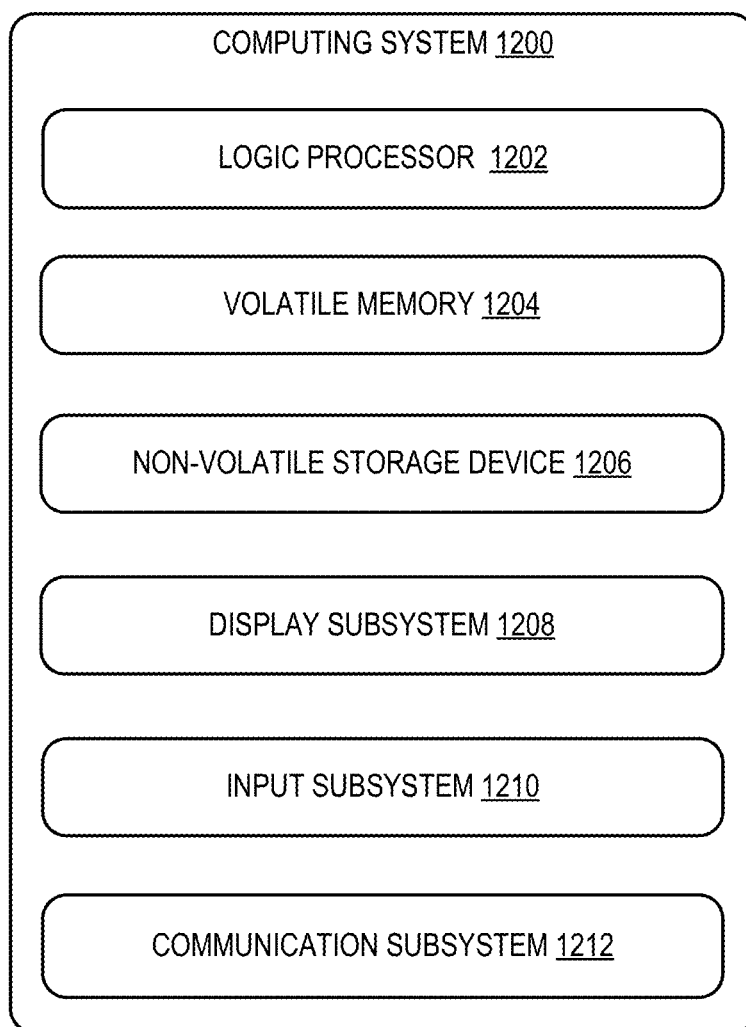
FIG. 12 shows a schematic view of an example computing environment in which the computing system of FIG. 1 may be enacted.

FIG. 12 schematically shows a non-limiting embodiment of a computing system 1200 that can enact one or more of the methods and processes described above. Computing system 1200 is shown in simplified form. Computing system 1200 may embody the computing system 10 described above and illustrated in FIG. 1. Computing system 1200 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 1200 includes a logic processor 1202 volatile memory 1204, and a non-volatile storage device 1206. Computing system 1200 may optionally include a display subsystem 1208, input subsystem 1210, communication subsystem 1212, and/or other components not shown in FIG. 12.

Logic processor 1202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1206 includes one or more physical devices configured to hold instructions executable by the logic processors to implement the methods and processes described herein. When such methods and processes are implemented, the state of non-volatile storage device 1206 may be transformed—e.g., to hold different data.

Non-volatile storage device 1206 may include physical devices that are removable and/or built-in. Non-volatile storage device 1206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1206 may include nonvolatile, dynamic, static, read/write, read-only, sequential-access, location-addressable, file-addressable, and/or content-addressable devices. It will be appreciated that non-volatile storage device 1206 is configured to hold instructions even when power is cut to the non-volatile storage device 1206.

Volatile memory 1204 may include physical devices that include random access memory. Volatile memory 1204 is typically utilized by logic processor 1202 to temporarily store information during processing of software instructions. It will be appreciated that volatile memory 1204 typically does not continue to store instructions when power is cut to the volatile memory 1204.

Aspects of logic processor 1202, volatile memory 1204, and non-volatile storage device 1206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1200 typically implemented in software by a processor to perform a particular function using portions of volatile memory, which function involves transformative processing that specially configures the processor to perform the function. Thus, a module, program, or engine may be instantiated via logic processor 1202 executing instructions held by non-volatile storage device 1206, using portions of volatile memory 1204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1208 may be used to present a visual representation of data held by non-volatile storage device 1206. The visual representation may take the form of a graphical user interface (GUI). As the herein described methods and processes change the data held by the non-volatile storage device, and thus transform the state of the non-volatile storage device, the state of display subsystem 1208 may likewise be transformed to visually represent changes in the underlying data. Display subsystem 1208 may include one or more display devices utilizing virtually any type of technology. Such display devices may be combined with logic processor 1202, volatile memory 1204, and/or non-volatile storage device 1206 in a shared enclosure, or such display devices may be peripheral display devices.

When included, input subsystem 1210 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1212 may be configured to communicatively couple various computing devices described herein with each other, and with other devices. Communication subsystem 1212 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1200 to send and/or receive messages to and/or from other devices via a network such as the internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
a processor having associated memory storing:
a discriminator configured to determine whether a target feature is real or synthetic;
a generator having been trained on an audio-visual pair of image data and first audio data with the discriminator;
a classifier having been trained on second audio data that is not paired with an image, the first audio data and the second audio data being recordings generated at substantially different geographical locations; and
instructions that cause the processor to execute, at runtime:
the generator configured to generate synthetic image features from third audio data; and
the classifier configured to classify a scene of the third audio data based on the synthetic image features.

2. The computing system of claim 1, wherein the memory further stores:
an encoder configured to receive an input image of a plurality of input images and encode the input image into real image features; and
a decoder configured to receive from the encoder the real image features and decode the real image features into a reconstructed image.

3. The computing system of claim 2, wherein
at training time, the generator generated first synthetic image features from the first audio data and generated second synthetic image features from the second audio data, and
the encoder, decoder, and discriminator have been trained through the following loop:
training the encoder and the decoder to increase a correlation of each of the reconstructed image and the first synthetic image to the respective input image;
training the generator, based on the determination output by the discriminator; and
training the discriminator while the encoder is fixed.

4. The computing system of claim 2, wherein the classifier has been trained while the encoder, decoder, generator, and discriminator are fixed.

5. The computing system of claim 2, wherein
the encoder, the decoder, the generator, the discriminator, and the classifier constitute an audio-visual generative adversarial network,
the encoder and the decoder include vector quantized variational autoencoder architecture, and
the classifier includes convolutional neural network (CNN) architecture.

6. The computing system of claim 2, wherein the processor is further configured to, at runtime:
execute the decoder, which is further configured to receive the synthetic image features and construct a synthetic image from the synthetic image features; and
display the synthetic image as a background image of a participant in a video chat, the synthetic image including generic features relating to the classified scene of the third audio data and lacking private identifying features of a real-world background of the participant.

7. The computing system of claim 1, wherein the processor is further configured to use the classified scene of the third audio data as a factor in authentication of a user.

8. The computing system of claim 1, wherein the processor is further configured to augment a navigation service based on comparing the classified scene of the third audio data to a scene of one or more known locations.

9. The computing system of claim 1, further comprising an autonomous vehicle, wherein the processor is configured to change a performance mode of the autonomous vehicle based at least in part on the classified scene of the third audio.

10. A method comprising,
at a processor at runtime of a neural network including a discriminator configured to determine whether a target feature is real or synthetic, a generator having been trained on an audio-visual pair of image data and first audio data with the discriminator, and a classifier having been trained on second audio data that is not paired with an image, the first audio data and the second audio data being recordings generated at substantially different geographical locations:
generating, with the generator, synthetic image features from third audio data; and classifying, with the classifier, a scene of the third audio data based on the synthetic image features.

11. The method of claim 10, further comprising:
receiving, with an encoder, an input image of a plurality of input images and encoding the input image into real image features; and
receiving from the encoder, with a decoder, the real image features and decoding the real image features into a reconstructed image.

12. The method of claim 11, wherein
at training time, the generator generated first synthetic image features from the first audio data and generated second synthetic image features from the second audio data, and
the encoder, decoder, and discriminator have been trained through the following loop:
training the encoder and the decoder to increase a correlation of each of the reconstructed image and the first synthetic image to the respective input image;
training the generator, based on the determination output by the discriminator; and
training the discriminator while the encoder is fixed.

13. The method of claim 11, wherein the classifier has been trained to classify the scene while the encoder, decoder, generator, and discriminator are fixed.

14. The method of claim 11, wherein
the encoder, the decoder, the generator, the discriminator, and the classifier constitute an audio-visual generative adversarial network,
the encoder and the decoder include vector quantized variational autoencoder architecture, and
the classifier includes convolutional neural network (CNN) architecture.

15. The method of claim 11, further comprising, at runtime:
constructing a synthetic image from the synthetic image features; and
displaying the synthetic image as a background image of a participant in a video chat, the synthetic image including generic features relating to the classified scene of the third audio data and lacking private identifying features of a real-world background of the participant.

16. The method of claim 10, further comprising using the classified scene of the third audio data as a factor in authentication of a user.

17. The method of claim 10, further comprising changing a performance mode of an autonomous vehicle based at least in part on the classified scene of the third audio.

18. A computing system comprising:
a processor having associated memory storing:
an encoder configured to receive an input image of a plurality of input images and encode the input image into real image features;
a decoder configured to receive from the encoder the real image features and decode the real image features into a reconstructed image;
a discriminator configured to determine whether a target feature is real or synthetic;
a generator having been trained on an audio-visual pair of image data and first audio data with the discriminator;
a classifier having been trained on second audio data that is not paired with an image, the first audio data and the second audio data being recordings generated at substantially different geographical locations; and
instructions that cause the processor to execute, at runtime:
the generator configured to generate synthetic image features from third audio data; and
the classifier configured to classify a scene of the third audio data based on the synthetic image features, wherein
the encoder, the decoder, the generator, the discriminator, and the classifier constitute an audio-visual generative adversarial network.

* * * * *